(12) United States Patent
Erickson et al.

(10) Patent No.: US 8,384,414 B2
(45) Date of Patent: Feb. 26, 2013

(54) IMPLEMENTING HACKING DETECTION AND BLOCK FUNCTION AT INDETERMINATE TIMES WITH PRIORITIES AND LIMITS

(75) Inventors: Karl R. Erickson, Rochester, MN (US); Phil C. Paone, Rochester, MN (US); David P. Paulsen, Dodge Center, MN (US); John E. Sheets, II, Zumbrota, MN (US); Gregory J. Uhlmann, Rochester, MN (US); Kelly L. Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/031,748

(22) Filed: Feb. 22, 2011

(65) Prior Publication Data

US 2012/0216301 A1   Aug. 23, 2012

(51) Int. Cl.
*H03K 19/00* (2006.01)
(52) U.S. Cl. ............................... 326/8; 726/34; 713/194

(58) Field of Classification Search ... 326/8; 726/34–35
See application file for complete search history.

(56) References Cited

U.S. PATENT DOCUMENTS

| 2009/0132836 A1* | 5/2009 | Mera et al. ..................... 713/310 |
| 2010/0037082 A1* | 2/2010 | Sakamoto et al. ............ 713/502 |

* cited by examiner

*Primary Examiner* — Jason M Crawford
(74) *Attorney, Agent, or Firm* — Joan Pennington

(57) ABSTRACT

A method and circuits for implementing a hacking detection and block function at indeterminate times, and a design structure on which the subject circuit resides are provided. A circuit includes an antenna wrapped around a dynamic bus inside circuitry to be protected. The antenna together with the dynamic bus node is designed so an average bus access activates a field effect transistor (FET) that is connected to a capacitor. The FET drains the capacitor in a specified number of activations by the antenna. The capacitor has a leakage path to a voltage supply rail VDD that charges the capacitor back high after a time, such as ten to one hundred cycles, of the dynamic bus being quiet. The capacitor provides a hacking detect signal for temporarily blocking operation of the circuitry to be protected responsive to determining that the dynamic bus is more active than functionally expected.

23 Claims, 6 Drawing Sheets

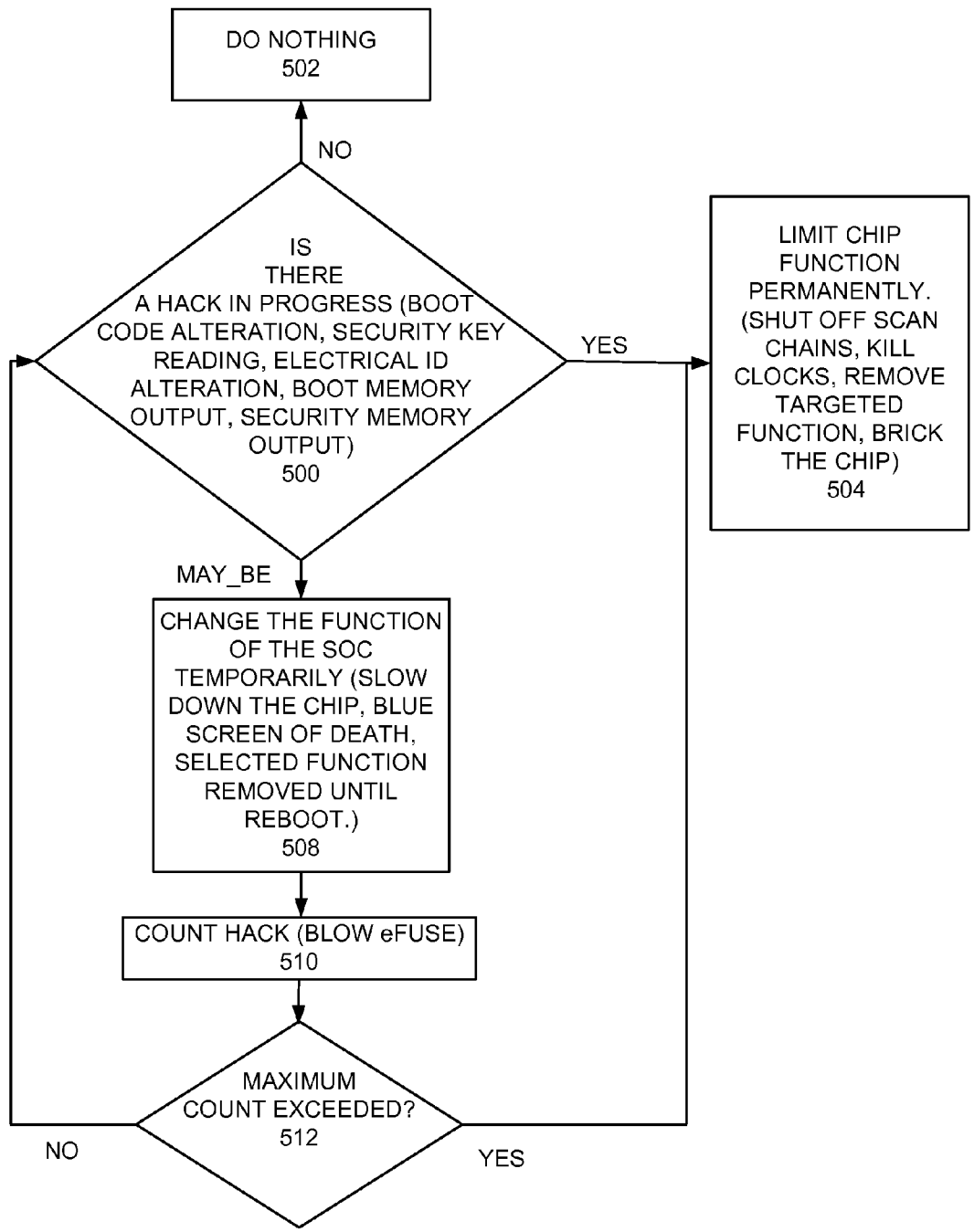

US 8,384,414 B2

IMPLEMENTING HACKING DETECTION AND BLOCK FUNCTION AT INDETERMINATE TIMES WITH PRIORITIES AND LIMITS

FIELD OF THE INVENTION

The present invention relates generally to the data processing field, and more particularly, relates to a method and circuits for implementing a hacking detection and block function at indeterminate times, and a design structure on which the subject circuit resides.

DESCRIPTION OF THE RELATED ART

A need exists for an effective arrangement for implementing a hacking detection and block function at indeterminate times for an integrated circuit, such as a system on a chip (SOC). Hacking detection is extremely important to secure hardware from unauthorized access but has many significant practical limitations. Typically the reaction to detected hacking is to destroy the hardware, for example, causing the hardware chip to permanently lock-up, also called bricking the chip. This means the hacking detection circuit must be created such that it will only trip if the designers are certain a hacking attempt is happening. This limits what the hacking detection circuit can trip on.

For an example a hacker would increment through an instruction space in order to figure out how a system on a chip (SOC) works. This can cause invalid instructions to be sent to the CPU. Getting one invalid instruction is not sufficient to cause a SOC shutdown but an invalid instruction indicates a known hacking technique.

Another hacking detection issue is the continuous reading or scanning of boot or other instruction storage memories in order to determine when certain instructions are executed. Some hacks allow the system to run a standard boot but then will stop the boot process before the full security system can be initialized. Of course normal function can not be flagged as a hacking attempt but this leaves a large functional area that can not be effectively monitored for hacking.

Because the chip is disabled during the hack attempt the hacker can identify what tripped the detection circuit and avoid that function in the future. This allows a trial-and-error approach to hacking a high volume commercially available electronics part, such as game consoles and cells phones. For example, with high volume parts hackers are looking for an exploit that can be used to change the intended function of the chip.

A need exists for an enhanced mechanism for efficiently and effectively protecting an integrated circuit device from hacking or unauthorized access. It is desirable to provide such enhanced mechanism that temporarily deactivates the integrated circuit device.

SUMMARY OF THE INVENTION

Principal aspects of the present invention are to provide a method and circuits for implementing a hacking detection and block function at indeterminate times, and a design structure on which the subject circuit resides. Other important aspects of the present invention are to provide such method, circuits and design structure substantially without negative effects and that overcome many of the disadvantages of prior art arrangements.

In brief, a method and circuits for implementing a hacking detection and block function at indeterminate times, and a design structure on which the subject circuit resides are provided. A circuit includes an antenna wrapped around a dynamic bus inside circuitry to be protected. The antenna together with the dynamic bus node is designed so an average bus access activates a field effect transistor (FET) that is connected to a capacitor. The FET drains the capacitor in a specified number of activations by the antenna. The capacitor has a leakage path to a voltage supply rail VDD that charges the capacitor back high after a time, such as ten to one hundred cycles, of the dynamic bus being quiet. The capacitor provides a hacking detect signal for temporarily blocking operation of the circuitry to be protected responsive to determining that the dynamic bus is more active than functionally expected.

In accordance with features of the invention, the circuitry to be protected includes an integrated circuit chip, such as a system on a chip (SOC). The hacking detection circuit detects hacking attacks, such as, a boot ROM being accessed several times or a security array being cycled through its entire address space.

In accordance with features of the invention, the hacking detect signal temporarily deactivates circuitry to be protected, for example, until the capacitor charges back high or the SOC is rebooted.

In accordance with features of the invention, a count limit is provided for the number of times the hacking detect signal temporarily blocks operation of the circuitry to be protected. After the limit is exceeded, then the circuitry to be protected is permanently disabled, or bricked.

In accordance with features of the invention, multiple FETs are provided to pull down the capacitive node. Each of the FET pull downs corresponds to a different attack, and defined priority.

In accordance with features of the invention, multiple pulse generators are provided, each corresponds to a different attack, and defined priority, inducing different lengths of time for the pull down charge from the capacitor.

In accordance with features of the invention, a master control override is added to the hacking detection circuit such that the capacitor node never pulls down, enabling work in the lab or testing by friendly forces that otherwise could trip the security hacking detect signal.

BRIEF DESCRIPTION OF THE DRAWINGS

The present invention together with the above and other objects and advantages may best be understood from the following detailed description of the preferred embodiments of the invention illustrated in the drawings, wherein:

FIG. 5 is a functional flow diagram illustrating an example hacking detection and blocking function for implementing hacking detection and blocking in accordance with a preferred embodiment.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and circuits for implementing a hacking detection and block function at indeterminate times, and a design structure on which the subject circuit resides are provided.

Figure 1:
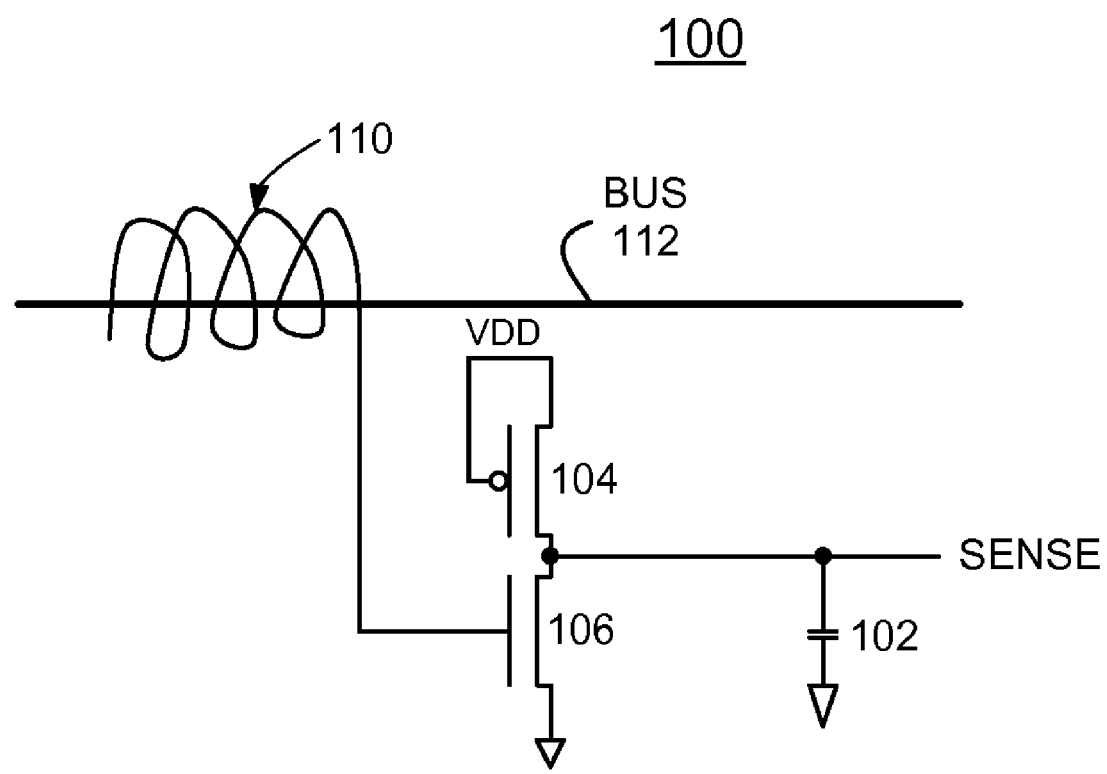
FIG. 1 is a schematic diagram representation illustrating an example hacking detection and blocking circuit for implementing hacking detection and blocking in accordance with a preferred embodiment.

Having reference now to the drawings, in FIG. 1, there is shown an example hacking detection and blocking circuit for implementing hacking detection and blocking generally designated by the reference character 100 in accordance with a preferred embodiment. The hacking detection and blocking circuit 100 includes a capacitor 102 connected between ground and a node SENSE connected to a junction connection of a P-channel field effect transistor (PFET) 104 and an N-channel field effect transistor (NFET) 106. PFET 104 and NFET 106 are series connected between a voltage supply rail VDD and ground. An antenna generally designated by the reference character 110 is wrapped around a dynamic bus 112 inside circuitry to be protected and connected to a gate input of the NFET 106.

The circuitry to be protected includes an integrated circuit chip, such as a system on a chip (SOC). The hacking detection circuit 100 detects hacking attacks, such as, a boot ROM being accessed several times or a security array being cycled through its entire address space. The capacitor 102 provides a hacking detect signal SENSE for blocking or deactivating circuitry to be protected responsive to determining that the dynamic bus 112 is more active than functionally expected.

The antenna 110 together with the dynamic bus 112 is designed so that an average bus access activates the N-channel field effect transistor (NFET) 106 that is connected to the capacitor 102. An example structure for implementing the antenna 110 and dynamic bus 112 is illustrated and described with respect to FIGS. 4A, 4B, and 4C.

In operation of the hacking detection circuit 100, NFET 106 drains the capacitor 102 in a specified number of activations by the antenna 110. The capacitor 102 has a leakage path via PFET 104 to the voltage supply rail VDD that charges the capacitor 102 back high after a time, such as ten to one hundred cycles, of the dynamic bus 112 being quiet.

Once this capacitor 102 drops to a predetermined voltage, the hacking detect signal SENSE temporarily deactivates circuitry to be protected, for example, until the capacitor 102 charges back high or the SOC to be protected is rebooted. The capacitor discharging operation causes the deactivation or fail point for each chip to vary, thus obfuscating what actually causes the fail. Additionally, since this fail is temporary the chip designers can use this technique to monitor chip functions that are not definite hacking fail points.

Often hackers use standard functions to determine the contents of an array. The hacking detection and blocking circuit 100 can discover an attempt to repeatedly access a secure memory space, over clocking the SOC, or invalid instructions. The hacking techniques that repeatedly access the same function of a chip like the instruction fetch to map the processor will yield bad results to the hacker due to the SOC deactivating intermittently responsive to the hacking detection and blocking circuit 100.

In accordance with features of the invention, the circuit 100 for implementing a hacking detection and block function that deters hacking of electronic devices to be protected without rendering those devices unusable while causing the hacker a degree of inconvenience at a relatively indeterminate time.

In accordance with features of the invention, another circuit is provided for implementing a hacking detection and block function that provides additional flexibility for the chip security designer for prioritizing attacks.

Figure 2:
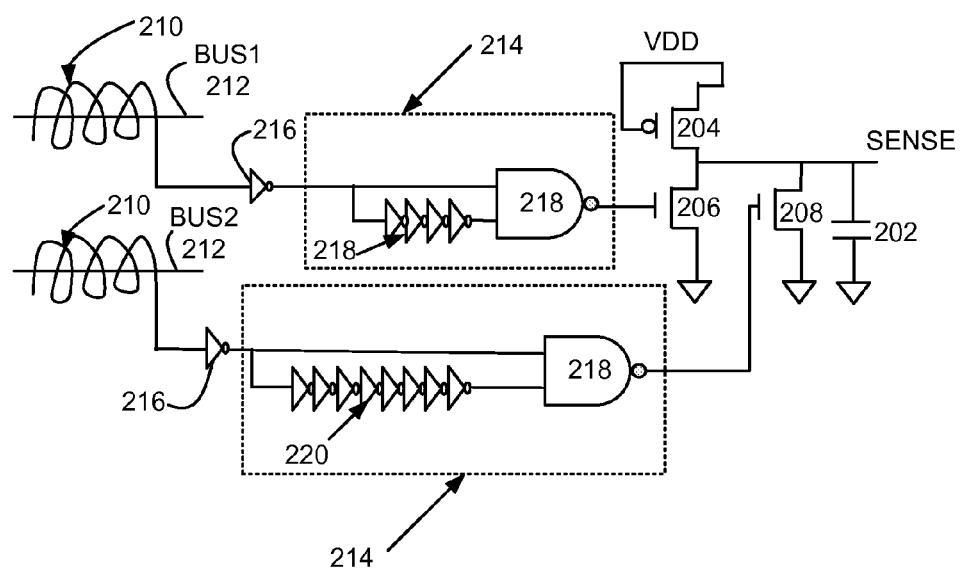
FIG. 2 is a schematic diagram representation illustrating another example hacking detection and blocking circuit for implementing hacking detection and blocking in accordance with a preferred embodiment.

Referring to FIG. 2, there is shown an example hacking detection and blocking circuit for implementing hacking detection and blocking generally designated by the reference character 200 in accordance with a preferred embodiment. The hacking detection and blocking circuit 200 includes features of the circuit 100 of FIG. 1.

In accordance with features of the invention, circuit 200 enables prioritizing hacking attacks. For example, invalid opcodes should cause the device to fail sooner than high activity on a first bus, the invalid opcode attack should be able to draw more charge from the capacitor than the other attack. This is achieved by having multiple pull downs on the capacitive node. Each of these pull downs corresponds to a different attack.

The hacking detection and blocking circuit 200 includes a capacitor 202 connected between ground and a node SENSE connected to a junction connection of a P-channel field effect transistor (PFET) 204 and a first N-channel field effect transistor (NFET) 206 and a second NFET 208 that are series connected between a voltage supply rail VDD and ground. A respective antenna generally designated by the reference character 210 is wrapped around a first dynamic bus 1, 212 and a second dynamic bus 2, 212 inside circuitry to be protected. Each of the first and second pull down NFETs 206, 208 is driven by a respective pulse generator 214 inducing different lengths of time for the pull down NFETs to draw charge off of the capacitor 202.

Each respective antenna 210 is connected by a respective inverter 216 to an input of a respective NAND gate 218. The antenna 210 provided with the first dynamic bus 1, 212 is applied to a first chain 218 providing a first delay to the NAND gate 218 connected to the first NFET 206. The antenna 210 provided with the second dynamic bus 212 is applied to a second inverter chain 220 providing a second delay to the NAND gate 218 connected to the second NFET 208. The inverter delay chains 218, 220 are arranged such that the gate input to the second NFET 208 is high longer relative to the gate input to the first NFET 206.

In operation the circuit 200 differentiates between high-activity on the first bus 1, 212 versus bus 2, 212. For example, the bus 2, 212 is more security crucial than bus 1, 212. The second NFET 208 is activated longer to draw more current from the sense capacitor 202 when there is activity on bus 2, 212 as compared to the operation of the first NFET 208 when there is activity on bus 1, 212.

In accordance with features of the invention, another circuit is provided for implementing a hacking detection and block function that provides a master override for lab or diagnostic use that avoids trip operation of the security circuit adding a master control PFET connected to the capacitor at the sense node SENSE.

Figure 3:
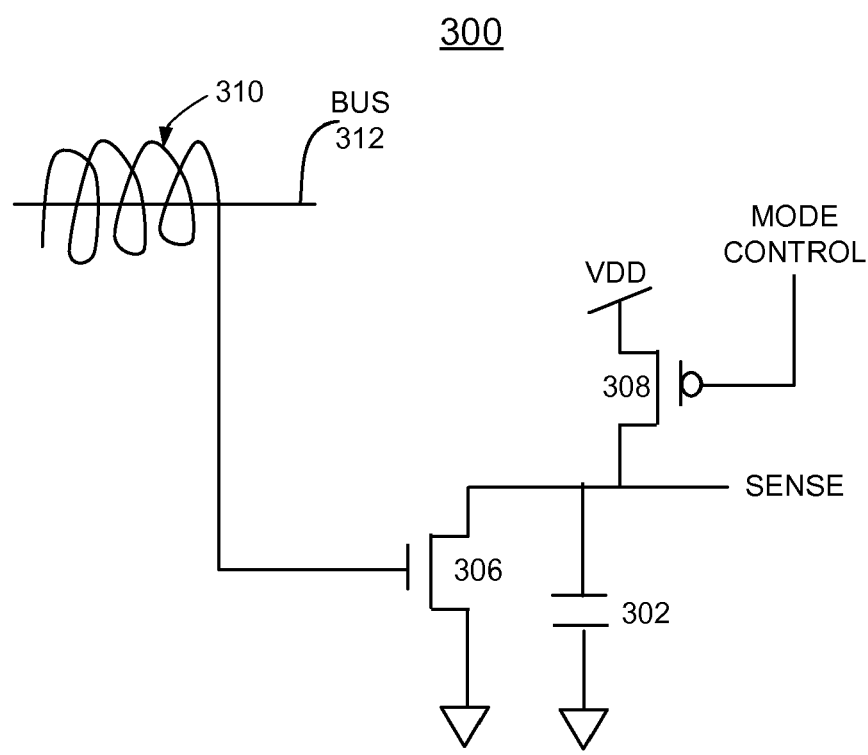
FIG. 3 is a schematic diagram representation illustrating another example hacking detection and blocking circuit for implementing hacking detection and blocking in accordance with a preferred embodiment.

Referring to FIG. 3, there is shown an example hacking detection and blocking circuit for implementing hacking detection and blocking generally designated by the reference character 300 in accordance with a preferred embodiment. The hacking detection and blocking circuit 300 includes features of the circuit 100 of FIG. 1.

The hacking detection and blocking circuit 300 includes a capacitor 302 connected between ground and a node SENSE connected to a junction connection of an N-channel field effect transistor (NFET) 306 and a P-channel field effect transistor (PFET) 308 that are series connected between ground and a voltage supply rail VDD. An antenna generally designated by the reference character 310 is wrapped around a dynamic bus 312 inside circuitry to be protected and connected to a gate input of the NFET 306.

The hacking detection and blocking circuit 300 includes a master override for lab or diagnostic use control signal MODE CONTROL is applied to the gate of PFET 308. When the chip protected is being used in a lab or is in pre-product stage and the operation that the hack detection circuitry 300 would normally be tripping upon is ignored. When the master control signal MODE CONTROL is activated, for example, from an available pin input on the chip, the PFET 308 holds the sense node to VDD such that the capacitor 302 does not discharge and thereby does not activate a security response, i.e. the block function is not enabled.

In operation of the hacking detection and blocking circuit 300, activating the master control signal MODE CONTROL applied to PFET 308 holds the node SENSE at the voltage supply rail VDD and capacitor 302 is not discharged despite any activity detection on bus 312 to enable lab or diagnostic use of the circuitry to be protected.

It should be understood that the scope of the present invention is not limited to the illustrated arrangements of the hacking detection and blocking circuits 100, 200, and 300 in accordance with the invention. For example, the hacking detection and blocking circuits 100, 200, and 300 in accordance with the invention can be implemented with a P-channel field effect transistor (PFET) connected to the antenna and the PFET charging the capacitor and an NFET path to ground for discharging the capacitor low with the dynamic bus being quiet, instead of the illustrated NFET 106, 206, 306 discharging the capacitor, and the path to the voltage supply rail VDD.

It should be understood that the hacking detection and blocking circuits 100, 200 can be implemented with a master control signal MODE CONTROL applied to illustrated PFET 104, 204 to enable lab or diagnostic use of the circuitry to be protected.

Figure 4C:
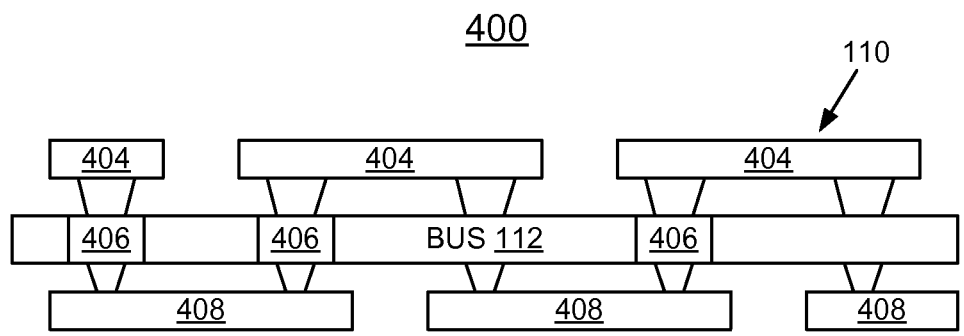
FIGS. 4A, 4B, and 4C are respective schematic perspective view, front plan view, and side plan view not to scale illustrating an example antenna and dynamic bus structure in accordance with a preferred embodiment.
Figure 4B:
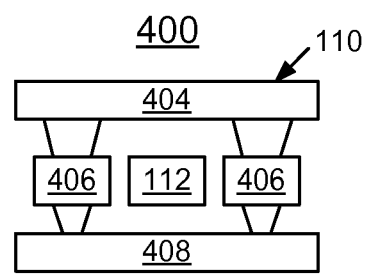
Figure 4A:
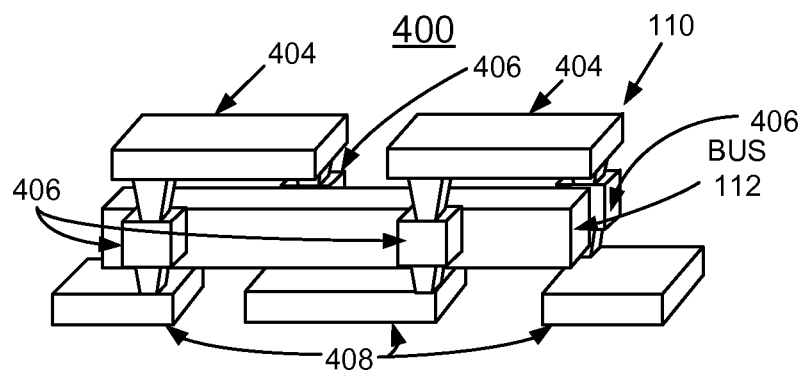

Referring to FIGS. 4A, 4B, and 4C, there are shown respective schematic perspective view, front plan view, and side plan view not to scale illustrating an example antenna and dynamic bus structure generally designated by the reference character 400 in accordance with a preferred embodiment. The antenna and dynamic bus structure 400 includes the antenna 110 and the bus 112. The antenna 110 is formed by upper antenna members 404 connected by interconnection member 406 to lower antenna member 408 disposed around the bus 112.

Referring to FIG. 5, there are shown a functional flow diagram illustrating example hacking detection and blocking functional operation in accordance with a preferred embodiment. As indicated at a decision block 500, checking for a hack in process, such as boot code alteration, security key reading, electrical ID alteration, boot memory output, or security memory output, is performed. When there is no hack in process, then no action is taken as indicated at a block 502.

When determined that there is a certain hack in process, then as indicated at a block 504 the chip function is limited permanently using conventional destruct mechanisms for the destruction of circuitry to be protected in a semiconductor chip. For example, at block 504 the scan chains are shut off, the clocks killed and/or the targeted function is permanently removed, bricking the chip.

When there may be a hack in process, then as indicated at a block 508 the chip function is temporarily changed, for example, with slow down of the chip, blue screen of death, killed and/or the targeted function is temporarily removed, such as until reboot. For example, at block 500 the possible hack is identified responsive to the hacking detect signal SENSE of circuits 100, 200, 300. The detected possible hack is counted as indicated at a block 510, for example, using a bank of a set number n of eFUSEs, or other type of non-volatile memory, to tally the number of possible or may be hacks. Every time a possible or may be hack occurs and the protected device is either locked up or blocked function, forcing a reboot, an eFUSE is blown at block 510. Checking whether the maximum count is exceeded is performed as indicated at a decision block 512. Only the maximum count n of lock-up-and-reboots is allowed. After the maximum count is exceeded, the device is permanently disabled or bricked at block 504. For example, this is achieved by checking the n-th eFUSE on boot-up. If that last eFUSE is blown, then the maximum count has been exceeded and boot-up is disabled with device permanently disabled at block 504. Otherwise, the operations continue returning to decision block 500, and checking if there is hack in process.

Figure 6:
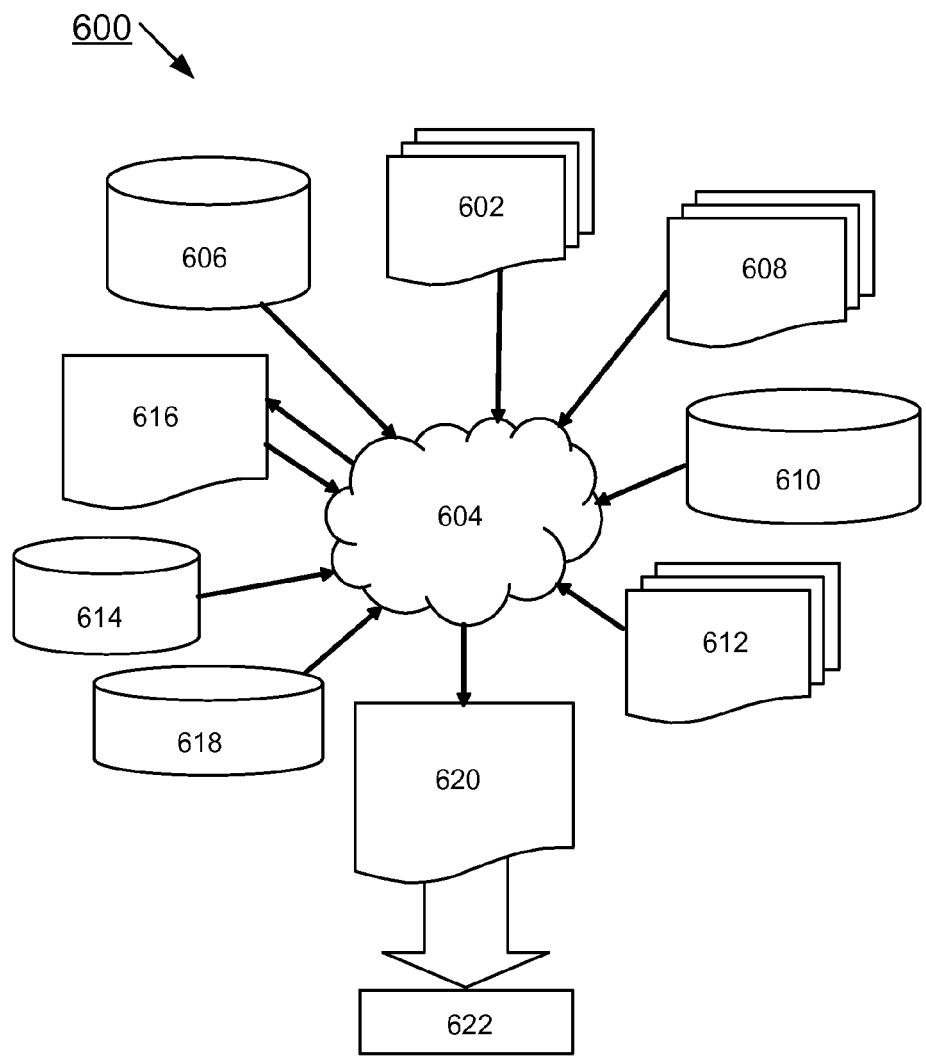
FIG. 6 is a flow diagram of a design process used in semiconductor design, manufacturing, and/or test.

FIG. 6 shows a block diagram of an example design flow 600. Design flow 600 may vary depending on the type of IC being designed. For example, a design flow 600 for building an application specific IC (ASIC) may differ from a design flow 600 for designing a standard component. Design structure 602 is preferably an input to a design process 604 and may come from an IP provider, a core developer, or other design company or may be generated by the operator of the design flow, or from other sources. Design structure 602 comprises circuit 100, circuit 200, and circuit 300 in the form of schematics or HDL, a hardware-description language, for example, Verilog, VHDL, C, and the like. Design structure 602 may be contained on one or more machine readable medium. For example, design structure 602 may be a text file or a graphical representation of circuit 100. Design process 604 preferably synthesizes, or translates, circuit 100, circuit 200, and circuit 300 into a netlist 606, where netlist 606 is, for example, a list of wires, transistors, logic gates, control circuits, I/O, models, etc. that describes the connections to other elements and circuits in an integrated circuit design and recorded on at least one of machine readable medium. This may be an iterative process in which netlist 606 is resynthesized one or more times depending on design specifications and parameters for the circuit.

Design process 604 may include using a variety of inputs; for example, inputs from library elements 608 which may house a set of commonly used elements, circuits, and devices, including models, layouts, and symbolic representations, for a given manufacturing technology, such as different technology nodes, 32 nm, 45 nm, 90 nm, and the like, design specifications 610, characterization data 612, verification data 614, design rules 616, and test data files 618, which may include test patterns and other testing information. Design process 604 may further include, for example, standard circuit design processes such as timing analysis, verification, design rule checking, place and route operations, and the like. One of ordinary skill in the art of integrated circuit design can appreciate the extent of possible electronic design automation tools and applications used in design process 604 without deviating from the scope and spirit of the invention. The design structure of the invention is not limited to any specific design flow.

Design process 604 preferably translates an embodiment of the invention as shown in FIGS. 1, 2 and 3 along with any additional integrated circuit design or data (if applicable), into a second design structure 620. Design structure 620 resides on a storage medium in a data format used for the exchange of layout data of integrated circuits, for example, information stored in a GDSII (GDS2), GL1, OASIS, or any other suitable format for storing such design structures. Design structure 620 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2 and 3. Design structure 620 may then proceed to a stage 622 where, for example, design structure 620 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A circuit for implementing hacking detection comprising:
   an antenna being wrapped around a dynamic bus inside circuitry to be protected;
   a field effect transistor (FET) connected to said antenna;
   said antenna activating said FET responsive to a bus access;
   a capacitor coupled to said FET;
   said FET discharging said capacitor responsive to a set number of activations of said FET by said antenna;
   said capacitor having a leakage path to a voltage supply rail for charging said capacitor high with said dynamic bus being quiet; and said capacitor providing a hacking detect signal for temporarily blocking operation of the circuitry to be protected responsive to a set dynamic bus activity.

2. The circuit as recited in claim 1 wherein said capacitor charges high after a set time in a range between ten to one hundred cycles of the dynamic bus being quiet.

3. The circuit as recited in claim 1 wherein said circuitry to be protected includes a system on a chip (SOC), and said hacking detect signal temporarily deactivates circuitry to be protected until said capacitor charges back high or the SOC is rebooted.

4. The circuit as recited in claim 1 includes a count limit of a number of times said hacking detect signal temporarily blocks operation of the circuitry to be protected; and responsive to said count limit being exceeded, the circuitry to be protected is permanently disabled.

5. The circuit as recited in claim 1 includes a plurality of FETs for discharging said capacitor; and each of said plurality of FETs corresponds to a different attack, and defined priority.

6. The circuit as recited in claim 1 includes a plurality of pulse generators, each respective pulse generator corresponds to a different attack and defined priority, providing a different length of time for discharging said capacitor.

7. The circuit as recited in claim 1 includes a master control override to prevent discharging of said capacitor.

8. The circuit as recited in claim 1 wherein said master control override includes a field effect transistor (FET) connected to said capacitor; said FET preventing discharge of said capacitor responsive to an applied mode control gate input.

9. A design structure embodied in a machine readable medium used in a design process, the design structure comprising:
   a circuit tangibly embodied in the machine readable medium used in the design process, said circuit for implementing hacking detection, said circuit comprising:
   an antenna being wrapped around a dynamic bus inside circuitry to be protected;
   a field effect transistor (FET) connected to said antenna;
   said antenna activating said FET responsive to a bus access;
   a capacitor coupled to said FET;
   said FET discharging said capacitor responsive to a set number of activations of said FET by said antenna;
   said capacitor having a leakage path to a voltage supply rail for charging said capacitor high with said dynamic bus being quiet; and said capacitor providing a hacking detect signal for temporarily blocking operation of the circuitry to be protected responsive to a set dynamic bus activity, wherein the design structure, when read and used in the manufacture of a semiconductor chip produces a chip comprising said circuit.

10. The design structure of claim 9, wherein the design structure comprises a netlist, which describes said circuit.

11. The design structure of claim 9, wherein the design structure resides on storage medium as a data format used for the exchange of layout data of integrated circuits.

12. The design structure of claim 9, wherein the design structure includes at least one of test data files, characterization data, verification data, or design specifications.

13. The design structure of claim 9, wherein said capacitor charges high after a set time in a range between ten to one hundred cycles of the dynamic bus being quiet.

14. The design structure of claim 9, wherein said circuitry to be protected includes a system on a chip (SOC), and said hacking detect signal temporarily deactivates circuitry to be protected until said capacitor charges back high or the SOC is rebooted.

15. The design structure of claim 9, includes a count limit of a number of times said hacking detect signal temporarily blocks operation of the circuitry to be protected; and responsive to said count limit being exceeded, the circuitry to be protected is permanently disabled.

16. The design structure of claim 9, includes a plurality of FETs for discharging said capacitor; and each of said plurality of FETs corresponds to a different attack, and defined priority.

17. The design structure of claim 9, includes a plurality of pulse generators, each respective pulse generator corresponds to a different attack and defined priority, providing a different length of time for discharging said capacitor.

18. The design structure of claim 9, includes a master control override to prevent discharging of said capacitor.

19. A method for implementing hacking detection comprising:
providing an antenna wrapped around a dynamic bus inside circuitry to be protected;
connecting a field effect transistor (FET) to said antenna;
said antenna, activating said FET responsive to a bus access;
coupling a capacitor to said FET;
said FET, discharging said capacitor responsive to a set number of activations of said FET by said antenna;
charging said capacitor high with said dynamic bus being quiet using a leakage path to a voltage supply rail from said capacitor; and
said capacitor, providing a hacking detect signal for temporarily blocking operation of the circuitry to be protected responsive to a set dynamic bus activity.

20. The method as recited in claim 19 wherein said circuitry to be protected includes a system on a chip (SOC), and providing said hacking detect signal temporarily deactivates circuitry to be protected until said capacitor charges back high or the SOC is rebooted.

21. The method as recited in claim 19 includes providing a count limit of a number of times said hacking detect signal temporarily blocks operation of the circuitry to be protected; and responsive to said count limit being exceeded, permanently disabling the circuitry to be protected.

22. The method as recited in claim 19 includes connecting a plurality of NFETs for discharging said capacitor; and each of said plurality of NFETs corresponds to a different attack, and defined priority.

23. The method as recited in claim 19 includes providing a master control override to prevent discharging of said capacitor.

* * * * *